(12) United States Patent
Hojo et al.

(10) Patent No.: US 6,756,148 B2
(45) Date of Patent: Jun. 29, 2004

(54) FUEL CELL SYSTEM

(75) Inventors: Nobuhiko Hojo, Neyagawa (JP); Aoi Tanaka, Osaka (JP); Satoshi Shibutani, Hirakata (JP); Yukihiro Okada, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/329,336

(22) Filed: Dec. 27, 2002

(65) Prior Publication Data

US 2003/0124408 A1 Jul. 3, 2003

(30) Foreign Application Priority Data

Dec. 28, 2001 (JP) .................................... 2001-399940

(51) Int. Cl.[7] .............................. H01M 8/04; H01M 8/06
(52) U.S. Cl. .............................. 429/35; 429/34; 429/36
(58) Field of Search ............................. 429/35, 34, 36, 429/37

(56) References Cited

U.S. PATENT DOCUMENTS 4,562,123 A  12/1985  Shimizu et al.
6,268,077 B1 * 7/2001  Kelley et al. ............. 429/34 X

FOREIGN PATENT DOCUMENTS

JP   P-2001102070 A   4/2001
JP   2001 338664      12/2001

* cited by examiner

Primary Examiner—John S. Maples
(74) Attorney, Agent, or Firm—McDermott, Will & Emery

(57) ABSTRACT

In a fuel cell system, leakage of a fuel and a by-product produced in oxidizing a fuel, and leakage thereof out of a fuel cell by evaporation are prevented. For this purpose, in a fuel cell system comprising an electrogenerating portion having a fuel electrode, an oxidant electrode and an electrolyte sandwiched between the fuel electrode and the oxidant electrode; a fuel accommodating container accommodating a fuel to be supplied to the fuel electrode; a fuel supplying portion supplying a fuel from the fuel accommodating container to the electrogenerating portion; and a fuel discharging portion connected to the fuel electrode, the fuel accommodating container, the fuel supplying portion, the fuel electrode and the fuel discharging portion are air-tightly connected.

13 Claims, 5 Drawing Sheets

FUEL CELL SYSTEM

BACKGROUND OF THE INVENTION

The present invention relates to a fuel cell system comprising a fuel cell using a hydrocarbon type fuel as a fuel and oxygen or air as an oxidant.

As the fuel of a fuel cell, there are used, for example, a hydrogen gas, or hydrocarbon type liquid or gaseous fuel. Fuel cells using a hydrocarbon type fuel include those of type reforming a fuel by a reforming apparatus to obtain a hydrogen gas and generating electricity using this hydrogen gas as a fuel, and those of type generating electricity using a directly supplied hydrocarbon type fuel. In the latter type cell, there is no necessity to use a reforming apparatus, and the size of a fuel cell system can be decreased.

Regarding the latter type cell, a reaction in a fuel cell using, as a hydrocarbon type fuel, for example, methanol is shown below.

Fuel electrode: $CH_3OH + H_2O \rightarrow CO_2 + 6H^+ + 6e^-$

Oxidant electrode: $3/2O_2 + 6H^+ + 6e^- \rightarrow 3H_2O$

Total cell reaction: $CH_3OH + 3/2O_2 \rightarrow CO_2 + 2H_2O$

As described above, carbon dioxide is produced as a product in a fuel electrode, in the fuel cell of type using a fuel directly. Therefore, a substance discharged from the fuel electrode contains a not-consumed fuel, carbon dioxide and the like. And, there was a problem that an increase in the amount of carbon dioxide by such powder generation raises the internal pressure of the fuel cell, thereby causing leakage of a fuel, decrease in cell performance and the like.

In contrast, there has been suggested, for example, a fuel cell system having a produced gas discharging mechanism which separates carbon dioxide and fuel from a substance discharged from a fuel electrode, by using a porous material constituted of a fluorocarbon resin, and selectively discharges only carbon dioxide out of a system (for example, Japanese Laid-Open Patent Publication No. 2001-102070, U.S. Pat. No. 4,562,123, and the like).

The above-mentioned produced gas discharging mechanism will be described referring to FIG. 5. FIG. 5 is a schematic cross-sectional view showing the structure of a fuel cell having a produced gas discharging mechanism. In the fuel cell shown in FIG. 5, a catalyst layer 54 and a gas diffusion layer 53 at the fuel electrode side and a catalyst layer 56 and a gas diffusion layer 57 at the oxidant electrode side sandwich an electrolyte membrane 55 to constitute an electrogenerating portion, and a fuel supplying tube 52 for supplying a fuel and a separation membrane 51 for selectively discharging carbon dioxide are provided. The separation membrane 51 is provided in contact with the fuel supplying tube 52, which is a passage for fuel leading to the gas diffusion layer 53, and carbon dioxide generated in the catalyst layer 54 is discharged out of the fuel cell via this separation membrane 51.

On the other hand, a user of a fuel cell has to exchange a fuel accommodating container when the remaining amount of a fuel decreases. Therefore, the user of a cell has to previously acknowledge a time of exchanging the fuel accommodating container. Regarding this matter, the remaining amount of a liquid fuel is made visible conventionally by installing a methanol consumption amount sensor using infrared ray, or by constituting a part of the fuel accommodating container with a transparent or semi-transparent material, for example.

However, the conventional produced gas discharging mechanism as described above cannot completely separate carbon dioxide and fuel selectively, and only can separate liquid and gas by utilizing a difference in surface tension onto a separation membrane. For this reason, not only carbon dioxide but also a fuel and other by-products than carbon dioxide produced in oxidizing the fuel are evaporated and discharged in the state of gas out of a fuel cell through the separation membrane.

A fuel and by-products thus discharged out of the fuel cell may contain a lot of substances having high toxicity and risk. For example, when methanol is used as a fuel, a fuel methanol and, formic acid, formaldehyde and the like that may be possibly produced as by-products in oxidizing the fuel, are deleterious substances, and evaporation and leakage out of a fuel cell of these compounds is a very important problem.

The present invention has been accomplished for solving the conventional problems as described above, and an object thereof is in a fuel cell system to completely prevent not only leakage of a fuel and by-products produced in oxidizing a fuel, but also leakage of them out of a fuel cell by evaporation. Simultaneously, another object of the present invention is to provide a fuel cell system capable of detecting the remaining amount of a fuel with high accuracy without separately providing a system detecting the remaining amount of a fuel.

BRIEF SUMMARY OF THE INVENTION

For solving the above-mentioned problem, the present invention provides a fuel cell system comprising: an electrogenerating portion having a fuel electrode, an oxidant electrode and an electrolyte membrane disposed between the fuel electrode and the oxidant electrode; a fuel accommodating container accommodating a fuel to be supplied to the fuel electrode; and a fuel discharging portion connected to the fuel electrode, characterized in that the fuel accommodating container, the fuel electrode and the fuel discharging portion are air-tightly connected.

It is preferable that the fuel cell system further comprises a product absorbing portion for absorbing a fuel oxidized product discharged from the fuel electrode.

In this case, the fuel oxidized product may contain carbon dioxide.

Further, the fuel oxidized product may contain a compound having a carboxyl group.

Furthermore, the fuel oxidized product may contain a compound having an aldehyde group.

Still further, the fuel oxidized product may contain a compound having a ketone group.

In the above-mentioned fuel cell system, it is preferable that the product absorbing portion absorbs the fuel oxidized product by physical adsorption.

Further, it is preferable that the product absorbing portion absorbs the fuel oxidized product by chemical adsorption.

It is preferable that the fuel cell system further comprises a gas detecting means for detecting the amount of carbon dioxide absorbed by the product absorbing portion.

It is preferable that the product absorbing portion and/or the fuel accommodating container is of cartridge type exchangeable by installing to the fuel cell system or detaching from the fuel cell system. Therefore, it is also preferable that the product absorbing portion and the fuel accommodating container are integrated.

While the novel features of the invention are set forth particularly in the appended claims, the invention, both as to organization and content, will be better understood and

BRIEF DESCRIPTION OF THE SEVERAL VIEWS OF DRAWING

DETAILED DESCRIPTION OF THE INVENTION

Figure 1:
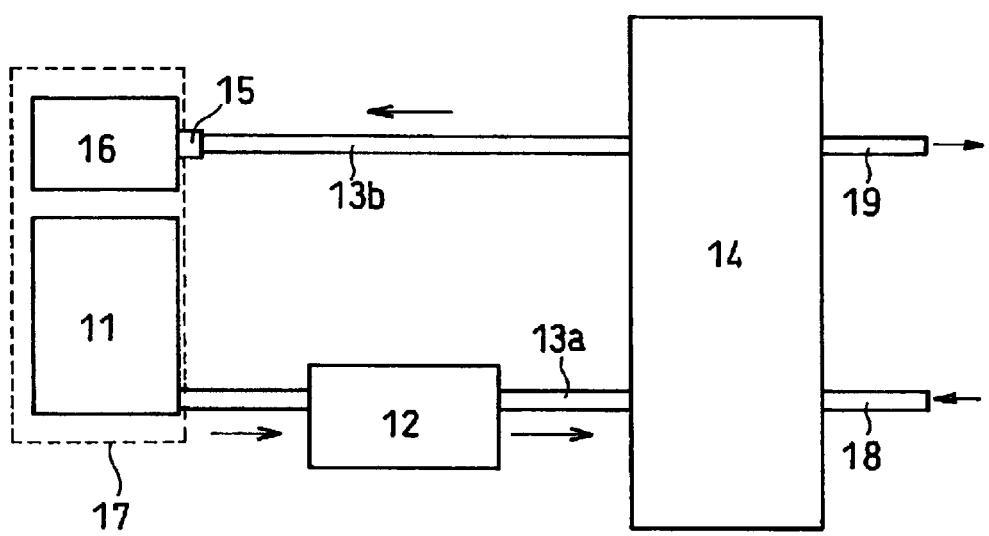
FIG. 1 is a schematic view showing a constitution of a fuel cell system according to an embodiment of the present invention.

One embodiment of the present invention will be described in detail referring to drawings. FIG. 1 is a schematic view showing a constitution of a fuel cell system according to an embodiment of the present invention. However, the present invention is not limited to this embodiment.

The fuel cell system shown in FIG. 1 comprises a fuel accommodating container 11, an electrogenerating portion 14, a fuel supplying tube 13a for supplying a fuel along the direction of an arrow from the fuel accommodating container 11 to the electrogenerating portion 14, a fuel supplying portion 12 comprising a pump or the like, a product absorbing portion 16 for absorbing a fuel oxidized product produced in the electrogenerating portion 14, a fuel discharging tube 13b for supplying a fuel oxidized product produced in the electrogenerating portion 14 and the like to the product absorbing portion along the direction of an arrow, an oxidant supplying tube 18 for supplying an oxidant to the electrogenerating portion 14 along the direction of an arrow, and an oxidant discharging tube 19.

Here, the fuel accommodating container 11, the fuel supplying portion 12, a fuel electrode of the electrogenerating portion 14, and the fuel discharging tube 13b constituting a discharging portion at the fuel electrode side and the product absorbing portion 16 are air-tightly connected. By this constitution, a product produced by oxidizing a fuel at a fuel electrode of the electrogenerating portion 14 and a fuel not consumed and the like can be treated without leaking out of the fuel cell system.

In the fuel cell system shown in FIG. 1, the fuel supplying portion 12 comprising a pump is provided, however, the fuel cell system according to the present invention can be constituted even without the fuel supplying portion 12. In this case, it is preferable that the fuel supplying tube 13a is constituted of a tube which is so narrow as to cause a capillary phenomenon. Alternatively, the fuel supplying tube 13a may be filled with non-woven fabric or porous material made of polyurethane, polyester, cellulose, phenol-type resin, polypropylene, glass fiber or the like, for assisting supply of a fuel.

The electrogenerating portion 14 is a fuel cell, for example, constituted of a unit cell obtained by sandwiching an electrolyte membrane with a fuel electrode and an oxidant electrode. In this case, a stack obtained by stacking a plurality of unit cells may be used, or a cell having a structure obtained by connecting a plurality of unit cells in series and in parallel in a plurality of planes may be used. Both of the fuel electrode and oxidant electrode contain a diffusion layer and a catalyst layer.

Figure 2:
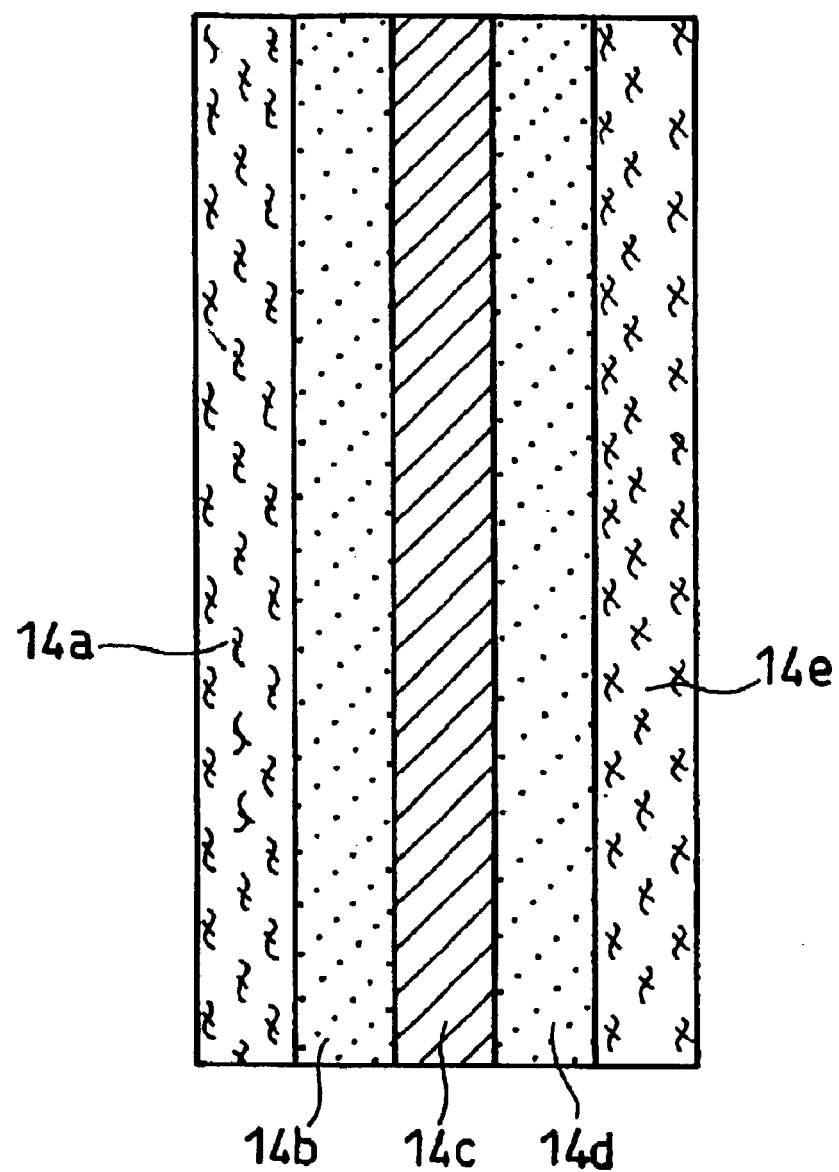
FIG. 2 is a schematic sectional view showing one example of a constitution of a unit cell used in the present invention.

Here, FIG. 2 shows one example of the constitution of the unit cell. As shown in FIG. 2, the unit cell is constituted of a gas diffusion layer 14a and a catalyst layer 14b at the fuel electrode side, an electrolyte membrane 14c, and a catalyst layer 14d and a gas diffusion layer 14e at the oxidant electrode side.

In FIG. 1, the fuel supplying tube 13a and the fuel discharging tube 13b are connected to the fuel electrode side of the electrogenerating portion 14, and the oxidant supplying tube 18 and the oxidant discharging tube 19 are connected to the oxidant electrode side of the electrogenerating portion 14.

Further, although not shown in FIG. 1, the oxidant supplying tube 18 for supplying an oxidant to the electrogenerating portion 14 may be only an opening tube which can diffuse naturally aspirated air as an oxidant into the electrogenerating portion 14, and for accelerating diffusion of air, a forced air feeding mechanism such as a fan, pump and the like may be provided.

As hydrocarbon-type fuels which can be used in the fuel cell system according to the present invention, there are, for example, alcohols such as methanol, ethanol and propanol, ethylene glycol, and ethers such as dimethyl ether and diethyl ether.

Of fuel oxidized products generating when using these fuels, particularly, carbon dioxide showing large volume expansion is a product which disturbs air-tight sealing or connection in a fuel cell system. Further, as a by-product which may possibly leak out of a fuel cell system by evaporation, compounds having a carboxyl group such as formic acid and compounds having an aldehyde group such as formaldehyde are listed.

It is preferable to place a separation membrane 15 between the product absorption portion 16 and the fuel supplying tube 13a. As this separation membrane 15, a so-called gas-liquid separation membrane through which liquid does not pass easily and only a gas passes easily can be used. This separation membrane 15 is constituted of a material (water-repellent and oil-repellent material) which can give different surface tensions to liquid and gas of a fuel. Further, members obtained by coating the surface of a porous material with such a material can also be used. Specifically, fluorocarbon resins such as tetrafluoroethylene-hexafluoropropylene copolymer (FEP) resin can be used.

In the product absorption portion 16, activated carbon or zeolite which immobilizes carbon dioxide by physical adsorption, alkaline solid or liquid absorbing carbon dioxide by a chemical reaction, and the like can be used. As the alkaline solid, there are hydroxides and carbonates of alkaline earth metals such as calcium and barium, and alkali metals such as potassium and sodium. As the alkaline liquid, there are aqueous solutions of the above-mentioned compounds, and diethanolamine and hydrazine which are non-aqueous liquids, and the like.

Air-tight sealing or connection of the whole fuel cell system can be achieved by immobilizing carbon dioxide having large volume expansion produced through an oxidization reaction of a fuel in the product absorption portion 16 to prevent carbon dioxide from leaking out of portions filled with a fuel, such as the fuel accommodating container 11, the fuel supplying portion 12, the fuel supplying tube 13a, a fuel electrode of the electrogenerating portion 14, the fuel discharging tube 13b and the product absorption portion 16.

By this, leakage of deleterious substances such as a fuel, fuel oxidized products and by-products out of a fuel cell system by evaporation and the like can be deleted for the first time. By using each of the product absorbing agent of the physical adsorption or the chemical adsorption type as a product absorbing agent in the product absorption portion 16, carbon dioxide which is the main fuel oxidized product, and formic acid and formaldehyde which may possibly leak as by-products out of a fuel cell system by evaporation and the like can be immobilized, and a safe fuel cell system can be realized.

It is preferable to provide, in the product absorption portion 16, a gas detecting means for confirming the amount of the absorbed product. Of the above-mentioned product absorbing agents, the latter product absorbing agent for absorbing carbon dioxide by a chemical reaction is a substance having basicity, therefore, change in pH occurs depending on the absorption amount of carbon dioxide by absorbing carbon dioxide having acidity. By detecting this pH change, the consumption amount of a fuel can be acknowledged, namely, the remaining amount of a fuel can be grasped.

For detecting pH change, for example, an indicator manifesting color change depending on pH change can be previously added in the product absorbing agent and the change can be visually confirmed. For example, by making a part of the product absorption portion 16 with a transparent or semi-transparent material, the remaining amount of a fuel can be visually checked. Therefore, the gas detection means is preferably a means for detecting the amount of absorbed carbon dioxide by color change of the indicator caused by pH change.

In this case, it is effective that the fuel accommodating container 11 is of cartridge type, since the fuel accommodating container 11 can be changed with a new one depending on the remaining amount of a fuel detected by the product absorption portion 16. Also, the product absorption portion 16 may be of cartridge type. Further, the fuel accommodating container 11 and the product absorption portion 16 may be integrated together to be of cartridge type. In FIG. 1, the fuel accommodating container 11 and the product absorption portion 16 are integrated to constitute a fuel cartridge 17. By removing only this fuel cartridge 17 and exchanging it with a new one, repeated use of the fuel cell system is possible.

In the product absorption portion 16, for example, a fact that the remaining amount of a fuel is small can be detected when an indicator which is basic and colorless before use becomes weak basic or neutral to generate color depending on absorption of carbon dioxide. By employing a design in which a product absorbing agent in a suitable amount is filled depending on the amount of a fuel previously charged in the fuel cartridge 17, the remaining amount of a fuel can be checked with high precision.

As the indicator added to such a product absorbing agent, indicators causing color change at from basic to weak basic or neutral may be used. As such an indicator, there are, for example, ethyl violet, phenolphthalein, alizalin yellow, cresol phthalein, thymol blue, alkali blue and the like.

As the other method of detecting pH change, there are mentioned methods of knowing pH by detecting potential difference using a glass electrode such as a so-called commercially available pH meter, for example. By this method, the consumption amount of a fuel can be known correctly from pH value, namely, the extent of the remaining amount of a fuel can be obtained at any time as an electric signal. Therefore, the gas detecting means may be a pH meter.

In the fuel cell system according to the present invention, the fuel electrode side of the electrogenerating portion 14 is air-tightly sealed, therefore, the inside of the product absorption portion 16 is always under negative pressure by absorbing a fuel oxidized product produced in power generation by the product absorption portion 16. Therefore, even if the fuel supplying portion 12 comprising a pump shown in FIG. 1 is not present, a fuel of the same volume as that of an absorbed gas is always supplied from the fuel accommodating container 11 to the electrogenerating portion 14 through the fuel supplying tube 13a.

At this time, the pressure inside of the fuel accommodating container 11 lowers with decrease in a fuel, therefore, it may be recommendable to previously charge an inert gas such as nitrogen or argon to increase the pressure in the fuel accommodating container 11 so that the pressure in the fuel accommodating container 11 does not become lower than the pressure in the product absorption portion 16 until complete consumption of a fuel. By this, a fuel can be consumed completely.

Figure 3:
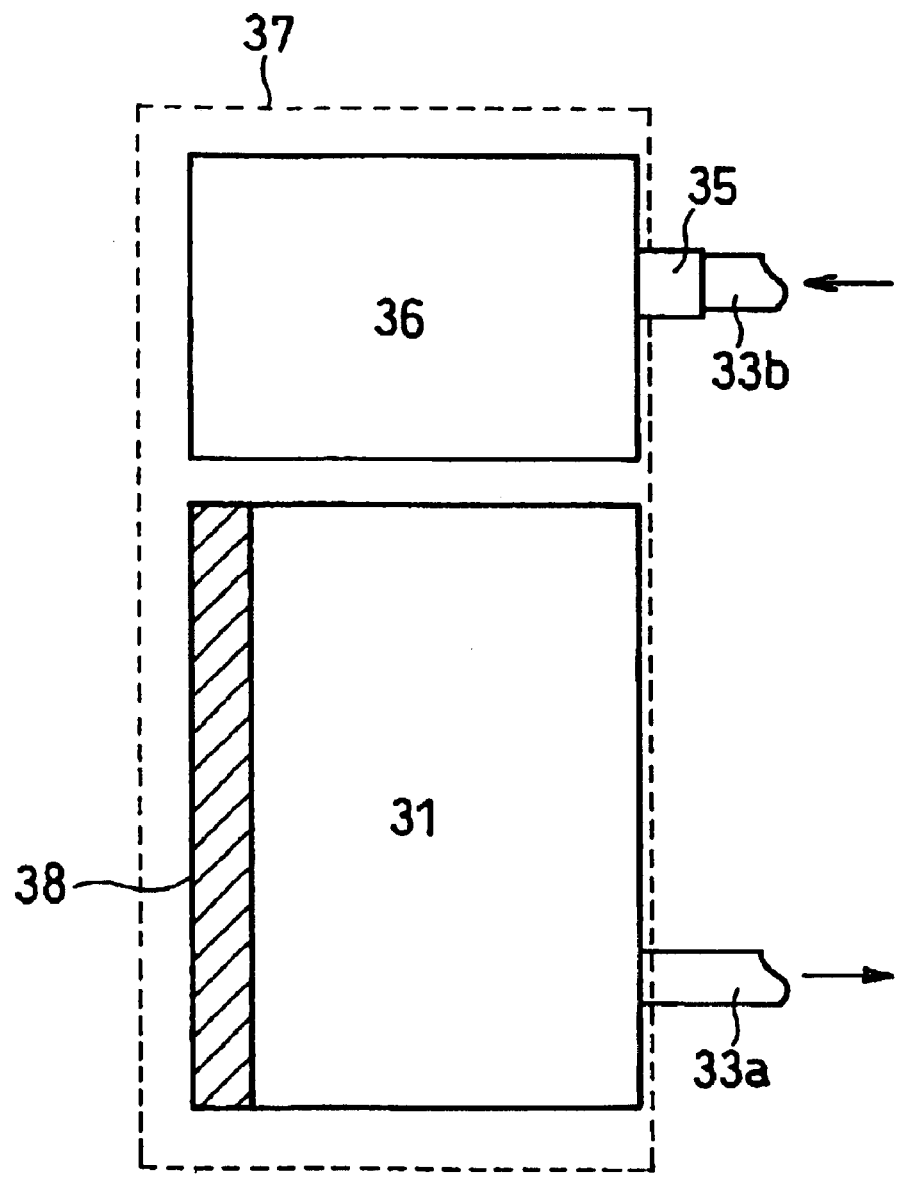
FIG. 3 is a view showing another embodiment of a part corresponding to that around a fuel cartridge 17 in FIG. 1.

Here, FIG. 3 is a view showing another embodiment of a part corresponding to that around the fuel cartridge 17 in FIG. 1. The fuel cartridge 37 shown in FIG. 3 comprises a fuel accommodating container 31, a separation membrane 35 and a product absorption portion 36, in which a fuel supplying tube 33 is connected to the fuel accommodating container 31, and a fuel discharging tube 33b is connected via the separation membrane 35 to the product absorption portion 36. A part of walls in the fuel accommodating container 31 is constituted of a movable moving partition wall 38.

As shown in FIG. 3, a part of walls in the fuel accommodating container 31 may also be a movable moving partition wall 38. For example, by applying pressure to this moving partition wall 38 from outside by spring, gas pressure or the like, to make the pressure in the product absorption portion 36 negative, and by moving the moving partition wall 38 in aspiration of a fuel from the fuel accommodating container 11 to always prevent the pressure in the fuel accommodating container 11 from being negative, a fuel can be consumed completely.

Figure 4:
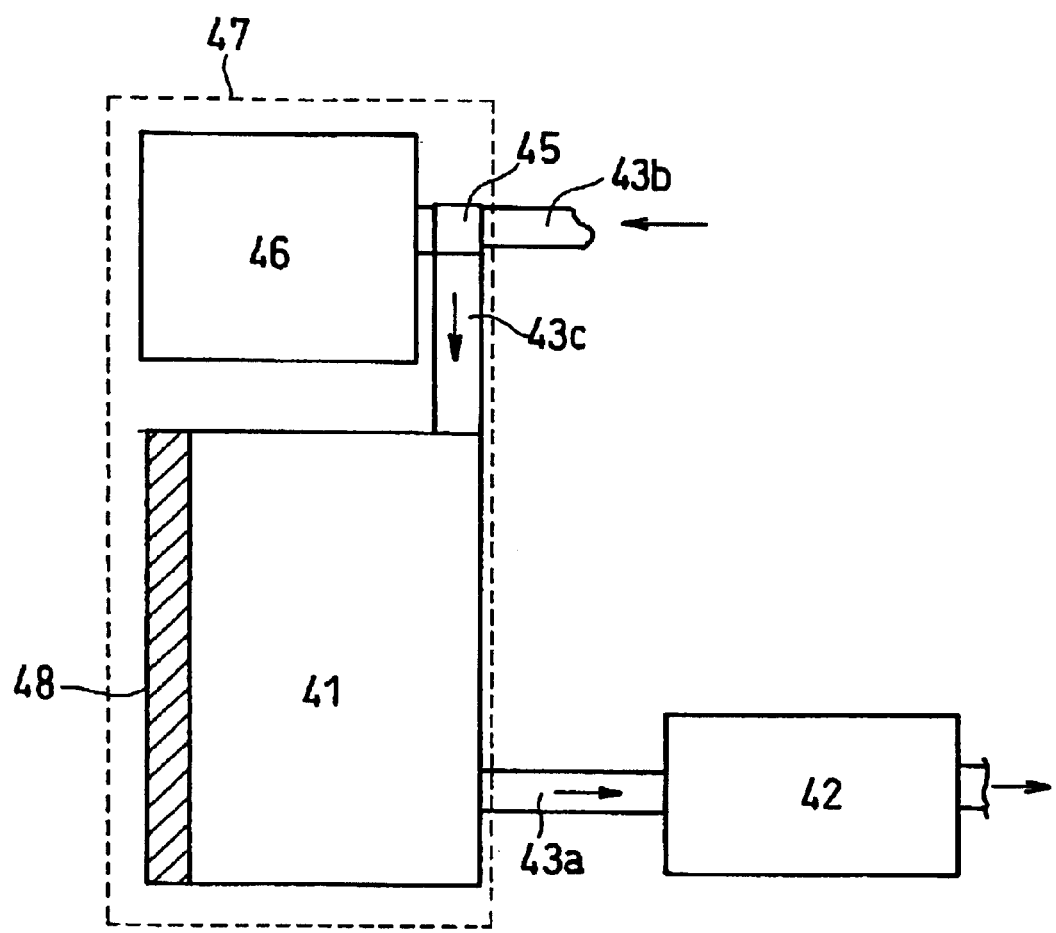
FIG. 4 is a view showing another embodiment of a part corresponding to that around a fuel cartridge 37 in FIG. 3.
Figure 5:
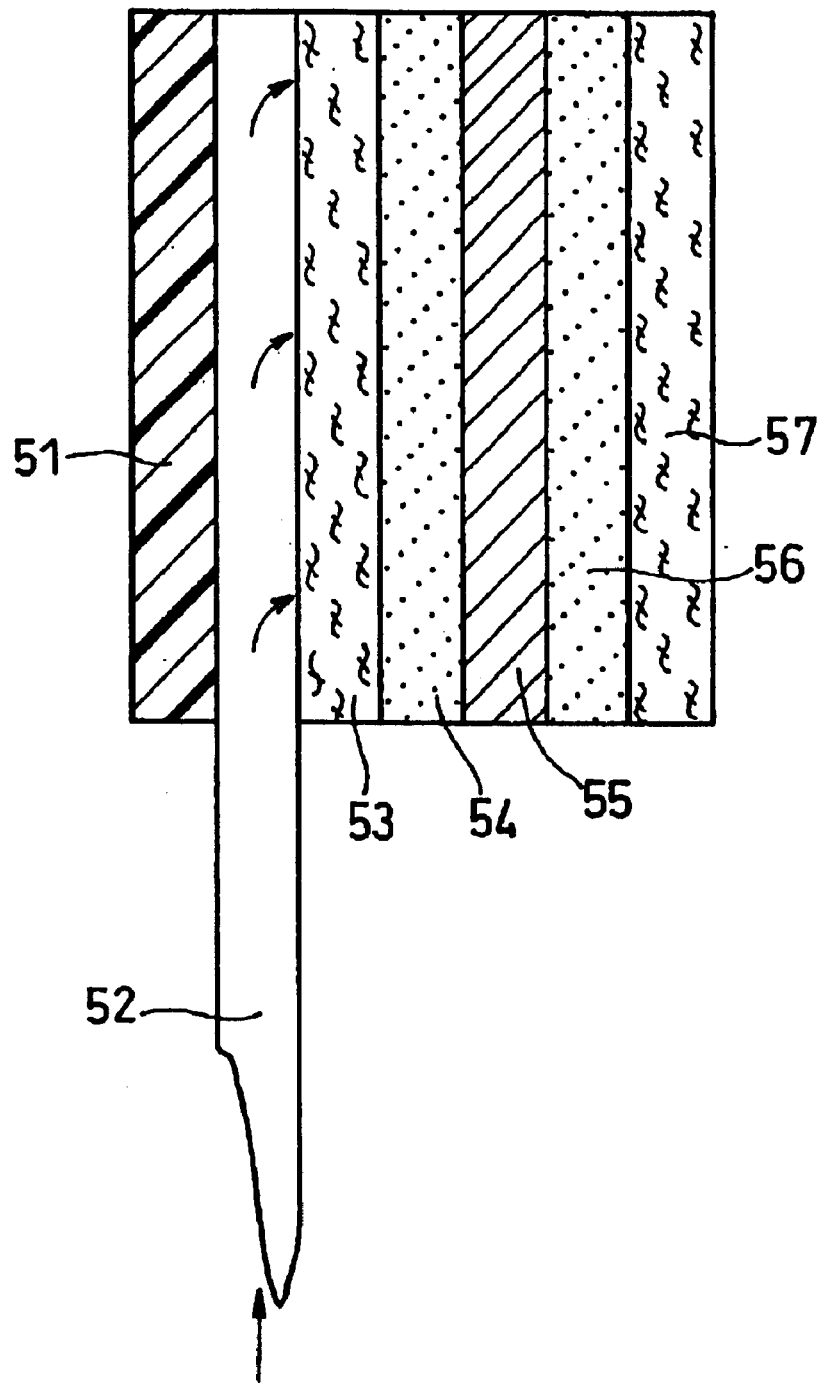
FIG. 5 is a schematic sectional view showing a constitution of a fuel cell having a produced gas discharging mechanism.

FIG. 4 is a view showing another embodiment of a part corresponding to that around the fuel cartridge 37 in FIG. 3. The fuel cartridge 47 shown in FIG. 4 comprises a fuel accommodating container 41, a separation membrane 45 and a product absorption portion 46, and is connected to a fuel supplying portion 42 comprising a fuel supplying tube 43a. A fuel supplying tube 43a is connected to the fuel accommodating container 41, and a fuel discharging tube 43b is connected via the separation membrane 45 to the product absorption portion 46. A part of walls in the fuel accommodating container 41 is constituted of a movable moving partition wall 48.

Further, in FIG. 4, the separation membrane 45 and the fuel accommodating container 41 are connected via a tube 43c. When a fuel supplying portion 42 is provided as shown in FIG. 4, a method in which flow of a fuel is not communicated between the product absorption portion 46 and the fuel accommodating container 41 as in the case containing no fuel supplying portion 42 may not be adopted. For example, a constitution can also be adopted in which a tube 43c is provided so that an unreacted (not-consumed) fuel separated in the separation membrane 45 returns again to the fuel accommodating container 41, and circulates in the fuel cell system repeatedly.

In the fuel cell system according to the present invention, a fuel is supplied from a fuel accommodating container to an electrogenerating portion via a fuel supplying tube, and a product absorption portion capable of absorbing a fuel oxidized product consumed and produced here by a reaction is provided, thus, a fuel and a product can be treated in an air-tightly sealed space. By this, a fuel cell system remarkably safe to users can be realized without discharging a fuel and fuel oxidized by-products having risk and toxicity out of the fuel cell system completely.

Further, according to the fuel cell system-according to the present invention, a fuel cell system can also be provided by which a fuel can be supplied to an electrogenerating portion stably until complete consumption of a fuel in this fuel air-tightly sealed space and power generation can be conducted stably until the last. In the fuel cell system according to the present invention, the consumption amount of a fuel can be detected, consequently, users can be informed of the remaining amount of a fuel and the exchange time of a fuel cartridge with high precision.

The present invention will be illustrated specifically below using examples, but is not limited only these examples.

EXAMPLES 1 TO 4

In these examples, a fuel cell system having a constitution shown in FIG. 1 was produced.

On Ketjhen Black EC (manufactured by AKZO Chemie, in Netherlands) which was a conductive carbon particles having an average primary particle size of 30 nm, platinum particles having an average particle size of about 30 Å was carried, to give catalyst supporting particles (50 wt % platinum) for the oxidant electrode side. Further, on Ketjhen Black EC, platinum particles and ruthenium particles having an average particle size of about 30 Å respectively were carried to obtain catalyst supporting particles (25 wt % platinum and 25 wt % ruthenium) for the fuel electrode side.

The catalyst supporting particles for the oxidant electrode side and the fuel electrode side and a dispersion of a hydrogen ion conductive polymer electrolyte were mixed respectively to give catalyst pastes for the oxidant electrode side and the fuel electrode side. In this operation, the mixing weight ratio of the catalyst supporting particles and the hydrogen ion conductive polymer electrolyte was 1:1. As the hydrogen ion conductive polymer electrolyte, perfluorocarbon sulfonic acid (Flemion manufactured by Asahi Glass Co. Ltd.) was used.

Next, on one surface of a hydrogen ion conductive polymer electrolyte membrane (Nafion 117 manufactured by Du Pont, USA), a catalyst paste for the oxidant electrode side was printed, and on the other surface, a catalyst paste for the fuel electrode side was printed. Then, a gas diffusion layer for the fuel electrode side and a gas diffusion layer for the oxidant electrode side, and the hydrogen ion conductive polymer electrolyte membrane were bonded by a hot press method to make a membrane-electrode assembly (MEA). In this case, the contact area of the fuel electrode and the oxidant electrode was 2 cm×2 cm. As the gas diffusion layer for the fuel electrode side and the gas diffusion layer for the oxidant electrode side, carbon non-woven fabric (thickness: 190 μm, porosity: 78%) was used. Thus, a electrogenerating portion 14 was obtained.

A product absorption portion 16 containing a product absorbing agent was inserted in a removable fuel cartridge 17, and 10 cc of a methanol aqueous solution having 5 wt % methanol concentration was charged in the fuel accommodating container 11. Here, used as the product absorbing agent was (1) activated carbon (specific surface area: 600 $m^2/g$) or (2) zeolite (specific surface area: 350 $m^2/g$), each absorbing carbon dioxide by physical adsorption, or (3) soda lime (94 wt % calcium hydroxide, 6 wt % potassium hydroxide) or (4) potassium carbonate aqueous solution (concentration: 40 wt %), each absorbing carbon dioxide by chemical adsorption. The use amount of the product absorbing agent was 10 g in each case.

Here, in order not to make the pressure inside of a tank of the fuel accommodating container 11 negative due to the consumption of the fuel, a nitrogen gas was charged in the tank to set the pressure in the tank at a pressure as high as 1.3 atm. At the inlet to the product absorption portion 16 in the fuel cartridge 17, a tetrafluoroethylene-hexafluoropropylene copolymer (FEP) resin membrane (film thickness: 25 μm, average pore size: 0.1 μm) as the separation membrane 15 having gas selective permeability. A pump was used as the fuel supplying portion 12 for supplying a fuel from the fuel accommodating container 11 to the electrogenerating portion 14. In an oxidized supplying tube 18a, forced supply of air by a fan was not conducted.

When the fuel cell system was operated at a pump flow rate per minute of 0.5 cc, output of 0.4 V and 200 mA was obtained in the case of any product absorbing agent. In any case, the voltage during powder generation was in the range from 0.4 to 0.45 V, and output could be obtained stably for up to 10 hours. Leakage of a gas out of a cell was not observed, of course. Further, access of air was allowed only to the oxidant electrode of the electrogenerating portion 14, and the fuel electrode and the fuel supplying tube 13a, the fuel discharging tube 13b, the fuel accommodating container 11 and the product absorption portion 16 were all put into a Teflon bag, which was then air-tightly sealed, and the fuel cell system was operated. After completion of the operation, a gas in the Teflon bag was analyzed by gas chromatography, to detect no methanol.

Therefore, according to the fuel cell system of the present invention, handling of a fuel in a complete air-tightly sealed system was made possible for the first time, and as a result, a safe fuel cell system discharging completely no fuel and fuel oxidized by-products, which were toxic out of the fuel cell system could be realized.

Approximately the same effect was obtained when materials obtained by adding barium hydroxide instead of calcium hydroxide in soda lime, mixtures thereof, and diethanol amine were used, as the product absorbing agent.

COMPARATIVE EXAMPLE 1

As the comparative example, a fuel cell system having the same constitution as in Example 1 excepting the following points was made. Namely, only a separation membrane 15 was provided at the end of a fuel discharging tube 13b and a product absorbing portion 16 was not provided, and a pore was made at the end of a fuel discharging tube 13b to make open to the air, and a gas discharged through the separation membrane was released directly into the air.

Such a fuel cell system was operated under the same operation conditions as in Example 1, to obtain out put of 0.40 V and 200 mA. As a result, output could be obtained stably between 0.35 V to 0.40 V for up to 7 hours. However, when a glass plate was approximated to the end pore of the fuel discharging tube 13b, liquid adhered to this glass plate. This liquid was diluted with pure water and analyzed by gas chromatography, to find that this aqueous solution contained methanol.

As compared with Example 1, voltage was somewhat lower, and the driving time was also somewhat short. At the completion of power generation, remaining of a gas was observed in the separation membrane 15, therefore, it was considered that with power generation, a gas could not be extracted completely from the separation membrane 15, the inner pressure near the gas outlet of the fuel discharging tube 13a increased, and excess load was imparted to the pump, thus, a fuel was not supplied sufficiently.

EXAMPLES 5 TO 10 AND COMPARATIVE EXAMPLE 2

In a fuel cell system having completely the same constitution as in Example 1, a product absorbing portion 16 and a fuel accommodating container 11 containing 10 cc of a methanol aqueous solution having a methanol concentration of 5 wt % were inserted in a removable fuel cartridge 17. Here, as the product absorbing agent, soda lime (94 wt % calcium hydroxide, 6 wt % potassium hydroxide) or a potassium carbonate aqueous solution (concentration: 40 wt %) of given amount was charged, further, ethyl violet was added as a color generating agent. The kinds and amounts of the product absorbing agents used were summarized in Table 1. The product absorption portion 16 in the fuel cartridge 17 was constituted of a transparent acrylic resin.

When the fuel cell system was operated at a pump flow rate per minute of 0.5 cc, output of 0.4 V and 200 mA was obtained at the initial stage of power generation in the case of any product absorbing agent. After power generation stable for given time at a voltage from 0.4 to 0.45 V, the voltage decreased sharply. 10 to 30 minutes before the sharp decrease in voltage, color generation (from white to violet) of the product absorbing agent was observed in some cases and was not observed in some cases. The results were summarized in Table 1.

As a result, when the product absorbing agent was present in excess amount for a fuel, operation was possible until a fuel was used approximately completely, however, color generation of the product absorbing agent was not observed until the last. When the product absorbing agent was insufficient, color generation of the product absorbing agent was observed before the stop of the fuel cell system, however, a fuel could not be used completely to the last period before the stop of operation of the fuel cell system. By previously using the product absorbing agent suitable for a fuel, when the remaining amount decreased, the exchanging time of the fuel cartridge 17 could be informed by color generation of the product absorbing agent.

TABLE 1

|  | Condition of product absorption portion | | Test result | |
| --- | --- | --- | --- | --- |
|  | Product absorbing agent | Use amount (g) | Continuous operation time (min) | Color generation |
| Example 5 | Soda lime | 3 | 615 | Observed |
| Example 6 | Soda lime | 5 | 630 | not observed |
| Example 7 | Soda lime | 10 | 645 | not observed |
| Example 8 | Potassium carbonate aqueous solution | 3 | 205 | Observed |
| Example 9 | Potassium carbonate aqueous solution | 5 | 335 | Observed |
| Example 10 | Potassium carbonate aqueous solution | 10 | 625 | Observed |
| Comparative example 2 | — | — | 420 | not observed |

When phenolphthalein, alizalin yellow, cresol phthalein, thymol blue or alkali blue was added in addition to ethyl violet as a color generation material for the product absorbing agent, the same discoloration was observed before the stop of operation of the fuel cell system though the discolored color and the product absorption amount were different. Even if these coloring agents were used, the exchanging time of the fuel cartridge 17 could be known by color generation of a product absorbing agent by previously using a product absorbing agent suitable for a fuel.

When pH change in the potassium carbonate aqueous solution as a product absorbing agent was checked, pH of the product absorbing agent changed from alkaline to neutral actually though the change was gradual. From this fact, even by measuring of pH of an absorbing agent, the consumption amount of a fuel could be detected, namely, the remaining amount of a fuel could be detected.

According to the present invention, not only leakage of a fuel and by-products produced in oxidizing a fuel but also leakage of them out of a fuel cell by evaporation can be prevented completely, in a fuel cell system. Simultaneously, according to the present invention, a fuel cell system can be provided capable of detecting the remaining amount of a fuel with high accuracy without separately providing a system detecting the remaining amount of a fuel.

Although the present invention has been described in terms of the presently preferred embodiments, it is to be understood that such disclosure is not to be interpreted as limiting. Various alterations and modifications will not doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell system comprising:
    an electrogenerating portion having a fuel electrode, an oxidant electrode and an electrolyte membrane sandwiched between said fuel electrode and said oxidant electrode;
    a fuel accommodating container accommodating a fuel to be supplied to said fuel electrode said fuel comprising a hydrocarbon-type fuel; and
    a fuel discharging portion connected to said fuel electrode,
    wherein said fuel accommodating container, said fuel electrode and said fuel discharging portion are airtightly connected.

2. The fuel cell system in accordance with claim 1, further comprising a product absorbing portion for absorbing a fuel oxidized product discharged from said fuel electrode.

3. The fuel cell system in accordance with claim 2, wherein said fuel oxidized product contains carbon dioxide.

4. The fuel cell system in accordance with claim 2, wherein said fuel oxidized product contains a compound having a carboxyl group.

5. The fuel cell system in accordance with claim 2, wherein said fuel oxidized product contains a compound having an aldehyde group.

6. The fuel cell system in accordance with claim 2, wherein said fuel oxidized product contains a compound having a ketone group.

7. The fuel cell system in accordance with claim 2, wherein said product absorbing portion absorbs said fuel oxidized product by physical adsorption.

8. The fuel cell system in accordance with claim 2, wherein said product absorbing portion absorbs said fuel oxidized product by chemical adsorption.

9. The fuel cell system in accordance with claim 3, further comprising a gas detecting means for detecting the amount of carbon dioxide absorbed by said product absorbing portion.

10. The fuel cell system in accordance with claim 2, wherein said product absorbing portion is of exchangeable cartridge type.

11. The fuel cell system in accordance with claim 2, wherein said fuel accommodating container is of exchangeable cartridge type.

12. The fuel cell system in accordance with claim 11, wherein said product absorbing portion and said fuel accommodating container are integrated.

13. The fuel cell system in accordance with claim 1, wherein said fuel is selected from the group consisting of methanol, ethanol, propanol, ethylene glycol, dimethyl ether and diethyl ether.

* * * * *